(12) United States Patent
Daep et al.

(10) Patent No.: US 12,332,160 B2
(45) Date of Patent: Jun. 17, 2025

(54) APPARATUS, SYSTEM, AND METHOD FOR TESTING BIOLOGICAL SAMPLES

(71) Applicants: Colgate-Palmolive Company, New York, NY (US); Regents of the University of Michigan, Ann Arbor, MI (US)

(72) Inventors: Carlo Daep, Brooklyn, NY (US); Deon Hines, Piscataway, NJ (US); Harsh Mahendra Trivedi, Hillsborough, NJ (US); James Masters, Ringoes, NJ (US); LaTonya Kilpatrick-Liverman, Princeton, NJ (US); Luciana Rinaudi Marron, Somerset, NJ (US); Lynette Zaidel, Cranford, NJ (US); Alexander H. Rickard, Ann Arbor, MI (US); Derek S. Samarian, Ann Arbor, MI (US); Gregory Kruse, Ann Arbor, MI (US)

(73) Assignee: COLGATE-PALMOLIVE COMPANY, New York, NY (US)

( * ) Notice: Subject to any disclaimer, the term of this patent is extended or adjusted under 35 U.S.C. 154(b) by 737 days.

(21) Appl. No.: 17/250,473

(22) PCT Filed: Oct. 29, 2020

(86) PCT No.: PCT/US2020/070716
§ 371 (c)(1),
(2) Date: Jan. 27, 2021

(87) PCT Pub. No.: WO2021/092612
PCT Pub. Date: May 14, 2021

(65) Prior Publication Data
US 2022/0357268 A1 Nov. 10, 2022

Related U.S. Application Data

(60) Provisional application No. 62/933,021, filed on Nov. 8, 2019.

(51) Int. Cl.
*G01N 21/05* (2006.01)
*G01N 21/64* (2006.01)
*G06V 20/69* (2022.01)

(52) U.S. Cl.
CPC ......... *G01N 21/05* (2013.01); *G01N 21/6458* (2013.01); *G06V 20/69* (2022.01)

(58) Field of Classification Search
CPC .... G01N 21/05; G01N 21/6458; G01N 21/11; G01N 2021/0346; G01N 2021/0357; G01N 21/253; G01N 21/6452; G06V 20/69

See application file for complete search history.

(56) References Cited

U.S. PATENT DOCUMENTS

| | | | | |
|---|---|---|---|---|
| 2,090,914 A | * | 8/1937 | Porter | G02B 21/34 359/398 |
| 2,940,360 A | * | 6/1960 | Carter, Jr. | G02B 21/34 359/398 |

(Continued)

FOREIGN PATENT DOCUMENTS

| | | |
|---|---|---|
| WO | 2011/085326 | 7/2011 |
| WO | 2015/048146 | 4/2015 |

(Continued)

OTHER PUBLICATIONS

Bernoulli's law; from link: https://www.stanmech.com/articles/flow-velocity-and-pressure#:~:text=Bernoulli's%20equation%20states%20mathematically%20that,the%20air%20density%20is%20constant.*

(Continued)

*Primary Examiner* — Mohamed K Amara

(57) ABSTRACT

A system for testing biological samples includes a frame having first and second sides and an aperture extending through the frame from the first side to the second side. First and second covers are attached to the first and second sides (Continued)

of the frame to form a well bounded by the frame, the first cover, and the second cover. An electromagnetic imaging device is used to image the biological sample through the first cover. A method is also conceived, wherein a first fluid is supplied to the well, the first fluid including live cells. A biofilm is grown from the live cells. A second fluid is supplied to the well and the biofilm is imaged using the electromagnetic imaging device.

18 Claims, 10 Drawing Sheets

(56) References Cited

U.S. PATENT DOCUMENTS

| | | | | |
|---|---|---|---|---|
| 3,591,461 | A * | 7/1971 | Bazil | C12M 23/10 359/398 |
| 3,726,597 | A * | 4/1973 | Dvorak | C12M 41/36 359/398 |
| 4,053,284 | A | 10/1977 | Posch | |
| 4,629,862 | A * | 12/1986 | Kitagawa | C12M 41/12 359/395 |
| 4,761,378 | A | 8/1988 | Godsey | |
| 4,974,952 | A * | 12/1990 | Focht | G02B 21/34 359/398 |
| 5,170,286 | A * | 12/1992 | Zimmerberg | G02B 21/34 359/398 |
| 5,257,128 | A * | 10/1993 | Diller | G02B 21/28 359/398 |
| 6,008,010 | A * | 12/1999 | Greenberger | C12M 23/12 435/813 |
| 7,091,035 | B2 | 8/2006 | Ravin et al. | |
| 7,221,455 | B2 * | 5/2007 | Chediak | G01N 21/05 356/417 |
| 7,612,891 | B2 * | 11/2009 | Wan | G01B 9/02057 356/503 |
| 8,293,524 | B2 * | 10/2012 | Ionescu-Zanetti | B01L 3/502738 435/395 |
| 8,293,525 | B2 * | 10/2012 | Richmond | G01N 15/1475 435/308.1 |
| 8,653,481 | B2 | 2/2014 | Packman et al. | |
| 9,103,754 | B2 * | 8/2015 | Handique | G01N 1/40 |
| 9,404,864 | B2 * | 8/2016 | Handique | G01N 21/6428 |
| 10,005,999 | B2 | 6/2018 | Larimer et al. | |
| 10,365,276 | B2 * | 7/2019 | Ermantraut | B01L 3/50273 |
| 10,384,203 | B2 * | 8/2019 | Yantz | A61B 5/150221 |
| 10,466,160 | B2 * | 11/2019 | Handique | G01N 35/00029 |
| 12,055,557 | B2 * | 8/2024 | Swanson | A01C 23/007 |
| 2004/0126876 | A1 | 7/2004 | Ravin et al. | |
| 2005/0051723 | A1 * | 3/2005 | Neagle | C12M 41/14 250/306 |
| 2006/0006067 | A1 * | 1/2006 | Unger | G01N 21/8483 204/603 |
| 2007/0031819 | A1 * | 2/2007 | Koschwanez | G01N 33/585 382/128 |
| 2016/0010045 | A1 | 1/2016 | Cohen et al. | |
| 2018/0112248 | A1 | 4/2018 | Lam et al. | |
| 2018/0164569 | A1 * | 6/2018 | Brinkman | G02B 21/16 |
| 2018/0274905 | A1 * | 9/2018 | Larimer | G01B 9/0209 |
| 2019/0339271 | A1 * | 11/2019 | Mohan | B01L 9/523 |

FOREIGN PATENT DOCUMENTS

| | | |
|---|---|---|
| WO | 2015/094849 | 6/2015 |
| WO | 2017/018934 | 2/2017 |
| WO | 2021/062607 A1 | 4/2021 |
| WO | 2021/062631 A1 | 4/2021 |

OTHER PUBLICATIONS

International Search Report and the Written Opinion of the International Searching Authority issued in International Application PCT/US2020/070716 mailed Feb. 5, 2021.

International Search Report and the Written Opinion of the International Searching Authority issued in International Application PCT/US2020/070717 mailed Feb. 15, 2021.

Samarian et al., 2014, "Use of a High-throughput In Vitro Microfluidic System to Develop Oral Multi-species Biofilms", Journal of Visualized Experiments, 94(1).

Sim et al., 2016, "Oral microbial biofilm models and their application to the testing of anticariogenic agents," Journal of Dentistry 50:1-11.

Sjollema et al., 1989, "Real-time enumeration of adhering microorganisms in a parallel plate flow cell using automated image analysis," Journal of Microbiological Methods 9(2):73-78.

Tolker-Nielsen T et al., 2011, "Growing and Analyzing Biofilms in Flow Chambers," Current Protocols in Microbiology 21(1):1B.2.1-1B.2.17.

Warthen, K. et al., The Impact of MEMS-Produced Micro-Electrode Material Coating on Dental Plaque Biofilm Growth Poster, National Nanotechnology Infrastructure Network, (Aug. 2013) p. 1.

Warthen, K. et al., The Impact of MEMS-Produced Micro-Electrode Material Coating on Dental Plaque Biofilm Growth Presentation, National Nanotechnology Infrastructure Network, (Aug. 2013) pp. 1-13.

* cited by examiner

APPARATUS, SYSTEM, AND METHOD FOR TESTING BIOLOGICAL SAMPLES

BACKGROUND

The present invention generally relates to a system and apparatus for testing biological samples and methods of performing said testing.

Various apparatuses and methods are currently used for performing testing on biological samples. The use of test tubes and microscope slides are commonly known for observing biological samples, but it is difficult to image a sample as it grows over time. Either samples must be extracted from a larger quantity of fluid at periodic intervals or the container containing the fluid under test must be imaged directly. However, the current solutions provide limited options for more sophisticated testing and imaging routines.

Improvements in testing methods and apparatuses for biological samples are desired.

BRIEF SUMMARY

The present application relates to a system and method for permitting the testing of one or more biological samples in a test environment that more accurately simulates real world conditions. This is particularly valuable for evaluating the effectiveness of various processes, including washing and treating of a biofilm with various fluids. Biofilms which grow from cells may be examined for growth rates, volume, roughness, and other parameters before and after various growth and treatment cycles. This allows more effective treatments to be efficiently developed.

In one embodiment, the present application provides a system for testing one or more biological samples comprising a frame having a first side, a second side, and an aperture extending from the first side to the second side. A first cover is attached to the first side and covers the aperture. A second cover is attached to the second side and covers the aperture. An electromagnetic imaging device is configured to image the one or more biological samples through the first cover.

In another embodiment, the frame may have a plurality of apertures which extend from the first side to the second side.

In another embodiment, the frame has a second aperture extending from the first side to the second side, a third cover attached to the first side and covering the second aperture, and a fourth cover attached to the second side and covering the second aperture.

In another embodiment, the system further includes a pH probe extending through the frame into the aperture.

In another embodiment, the first cover is transparent.

In another embodiment, the second cover is transparent.

In another embodiment, the frame has third and fourth sides, the third side having a first longitudinal passageway and the fourth side having a second longitudinal passageway, the first and second longitudinal passageways extending through the frame to the aperture.

In another embodiment, a first tube fitting is installed in the first longitudinal passageway and a second tube fitting is installed in the second longitudinal passageway, a first tube attached to the first tube fitting and a second tube attached to the second tube fitting.

In another embodiment, the second cover has a depression, the depression fluidly coupled with the aperture. In some embodiments, a sample is located in the depression of the second cover.

In another embodiment, the first cover and the second cover are attached with an adhesive comprising silicone.

In another embodiment, the system includes a stand having two depressions, the frame having two arms that engage the two depressions of the stand to maintain the frame in an upright orientation.

In another embodiment, a plurality of protrusions extending from the second side of the frame. In some embodiments, the second cover is positioned between two of the plurality of protrusions.

In yet another embodiment, the present application provides a method of testing a biological sample comprising providing an apparatus having a frame with a first side, a second side, and an aperture extending from the first side to the second side. The apparatus further includes first and second covers attached to the first and second sides, respectively. The first and second covers cover the aperture and form a well defined by the frame, the first cover, and the second cover. First and second tubes are fluidly coupled to the well. A first fluid is supplied to the well via the first tube. The first fluid has live cells therein. A biofilm is grown from the live cells in the first fluid. A second fluid is supplied to the well via the first tube, the second fluid being sterile. The biofilm is imaged within the well.

In another embodiment, the second fluid includes toothpaste.

In another embodiment, the apparatus comprises a plurality of wells.

In another embodiment, the second fluid is mixed in a syringe prior to step d).

In another embodiment, a pH probe is used to monitor the pH within the well.

In another embodiment, step a-1), subsequent to step a), comprises providing a solid test sample in the well.

In another embodiment, step a-2), subsequent to step a-1), comprises testing the hardness of the solid test sample in the well.

In another embodiment, step f), subsequent to step d), comprises testing the hardness of the solid test sample in the well.

In another embodiment, steps c) and d) are repeated prior to step e).

In another embodiment, the apparatus is heated to 37 degrees Celsius.

In another embodiment, the live cells are incubated for a period of time in step d).

In another embodiment, the second fluid comprises a growth medium.

In another embodiment, step f), subsequent to step d), comprises supplying a third fluid to the well via the first tube, the third fluid being sterile.

In another embodiment, the second and third fluid are the same.

In another embodiment, the second and third fluid are different.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features, and advantages of the invention will be apparent from the following more detailed description of certain embodiments of the invention and as illustrated in the accompanying drawings in which.

Figure 1:
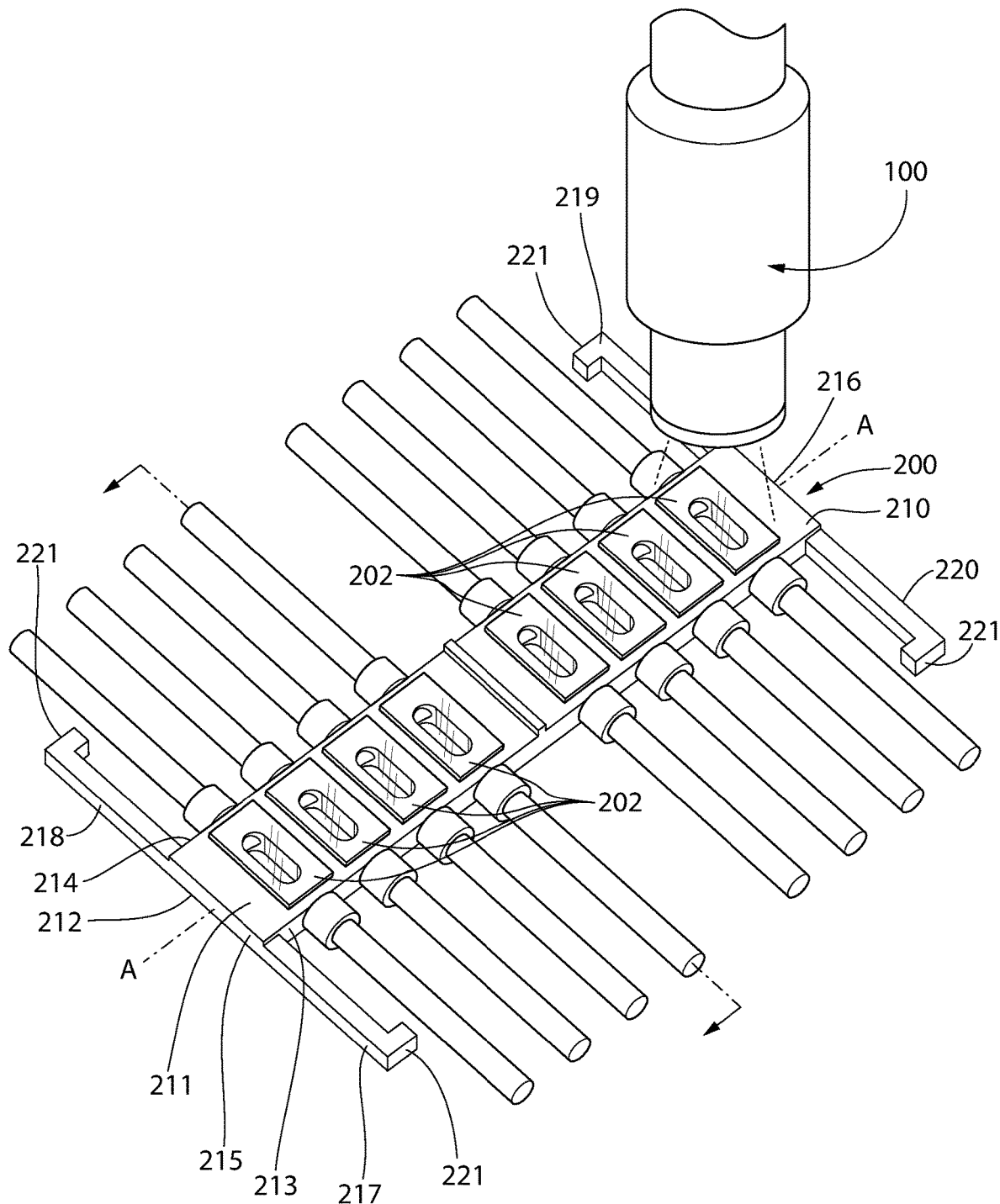
FIG. 1 is a schematic perspective view of a system according to one embodiment of the invention showing a microscope and the apparatus.

All drawings are schematic and not necessarily to scale. Features numbered in some views but not in others are the same features unless expressly noted otherwise herein.

DETAILED DESCRIPTION

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Referring to FIG. 1, a system according to the present disclosure comprises an electromagnetic imaging device 100 and an apparatus 200. The electromagnetic imaging device 100 may be any device which uses electromagnetic waves to form an image. This may be an optical imaging system such as an optical microscope including a bright field microscope or a fluorescent microscope. It may also be an electron microscope, confocal laser scanning microscope, stereo microscope, or any other imaging device. The apparatus 200 has a plurality of wells 202 which may be imaged by the imaging device 100. The wells 202 may each contain a biological sample under test.

In one embodiment, the apparatus 200 has a frame 210 having a first side 211, a second side 212 opposite the first side 211, a third side 213, and a fourth side 214 opposite the third side 213. At first and second ends 215, 216 of the frame 210, a first arm 217, second arm 218, third arm 219, and fourth arm 220 extending from the third side 213 and fourth side 214 of the frame 210. The arms 217-220 are symmetric about a longitudinal axis A-A extending between the first and second ends 215, 216 of the frame 210. Each of the first, second, third, and fourth arms 217-220 have a foot 221 at the end of the respective arms 217-220.

Figure 2:
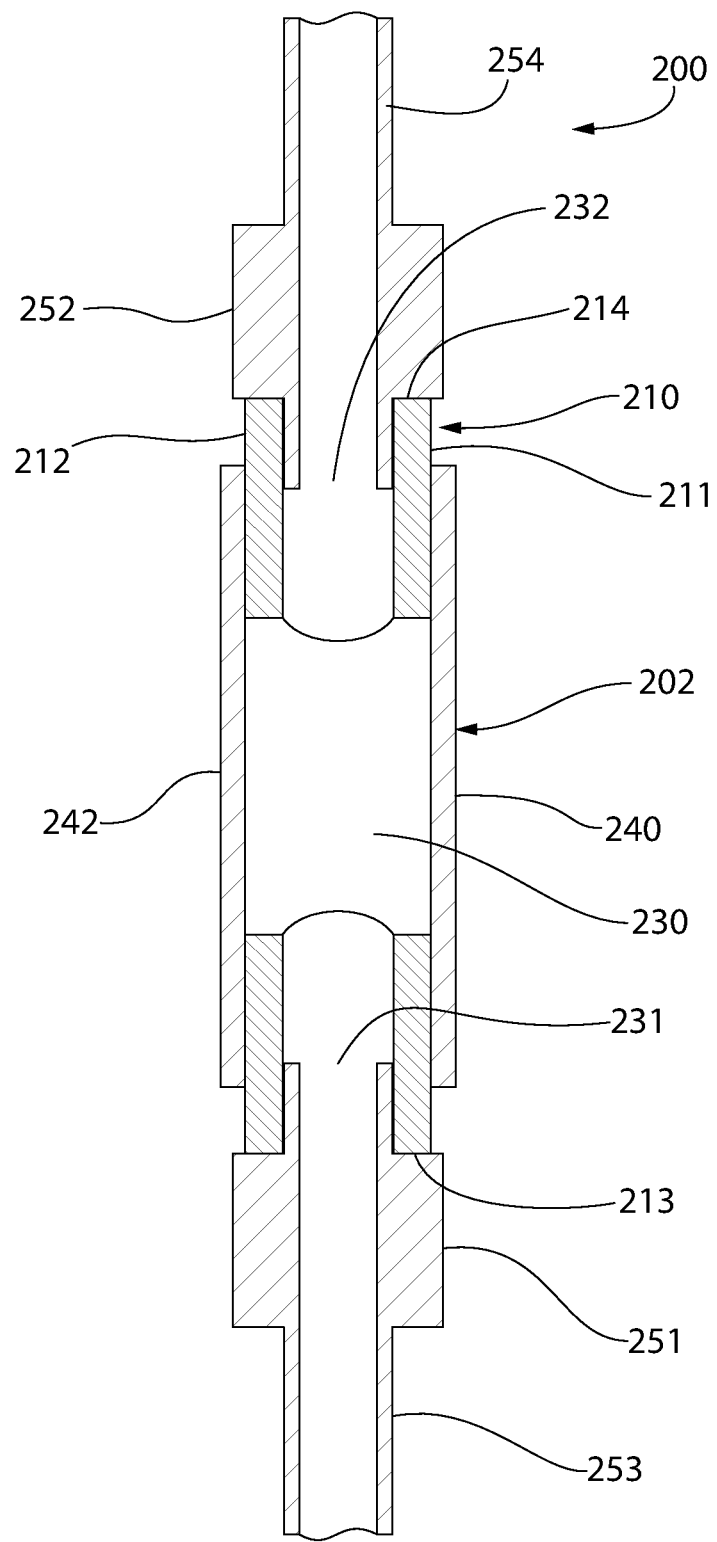
FIG. 2 is a schematic side cross-sectional view of the apparatus of FIG. 1 showing a well.

As best shown in FIG. 2, the frame 210 further comprises an aperture 230 extending through the frame from the first side 211 to the second side 212. A first longitudinal passageway 231 extends from the third side 213 to the aperture 230. A second longitudinal passageway 232 extends from the fourth side 214 to the aperture 230. In addition to the frame 210, the apparatus 200 comprises a first cover 240, a second cover 242, a first tube fitting 251, a second tube fitting 252, a first tube 253, and a second tube 254. In the embodiment shown in FIGS. 1 and 2, the first cover 240 is attached to the first side 211 and overlies the aperture 230, sealing the aperture 230 on the first side 211. The second cover 242 is attached to the second side 212 and overlies the aperture 230, sealing the aperture 230 on the second side 212. The well 202 is formed by the space enclosed by the first cover 240, second cover 242, and the aperture 230.

In the embodiment of FIGS. 1 and 2, the covers 240, 242 are formed of a transparent material such as glass. In other embodiments, one or more of the covers 240, 242 may be formed of a translucent or an opaque material depending on the intended application. In yet other embodiments, one or more of the covers 240, 242 may be reflective so as to improve the quality of the images obtained by the electromagnetic imaging device 100. The covers 240, 242 may even be transparent or translucent in different portions of the electromagnetic spectrum. The covers 240, 242 are preferably attached with a silicone-based adhesive to simultaneously adhere the covers 240, 242 to the frame 210 and seal the joint between the covers 240, 242 and the frame. Other adhesives are contemplated, but the resulting joint must be fluid tight and free of leaks to ensure that no fluid escapes from the wells 202 except via the first and second longitudinal passageways 231, 232. In some embodiments, a single cover is used to cover a plurality of apertures 230 on the first side 211 and another cover is used to cover a plurality of apertures 230 on the second side 212.

The first tube fitting 251 and first tube 253 are coupled to the first longitudinal passageway 231. The second tube fitting 252 and the second tube 254 are coupled to the second longitudinal passageway 232. This allows a fluid to be selectively introduced to the well 202 by way of the first or second tube 251, 253. Similarly, the fluid may be evacuated by the other one of the first or second tube 251, 253 to permit fluid to flow through the well 202.

The aperture 230 may be formed as a slot having radiused ends, a rectangle, an oval, or a square. The aperture 230 provides an opening which may be imaged by the imaging device 100 through either the first cover 240 or the second cover 242. Thus, it may be advantageous to have an aperture 230 which is sized and shaped to aid in imaging the well 202 or to promote ideal test conditions within the well 202. Eight wells 202 may be provided in the apparatus 200. Alternately, only a single well 202, or fewer or more than eight wells 202 may be provided, depending on the needs of a test regime.

The frame 210 may be formed in one of a variety of methods, including additive manufacturing (i.e. 3D printing), molding, milling, or other processes known in the art. Additive techniques such as stereolithography (SLA), digital light processing (DLP), fused deposition modeling (FDM), selective laser sintering (SLS), selective laser melting (SLM), electronic beam melting (EBM), laminated object manufacturing (LOM), binder jetting (BJ), or material jetting (MJ) may be used. Additive manufacturing techniques are considered most valuable for forming the frame 210 because the frame can be rapidly redesigned and modified for different applications and tests without the need for extended lead times for machining or mold making. Furthermore, complicated geometries are more readily realized through additive manufacturing processes.

In some embodiments, the well 202, the first and second longitudinal passageways 231, 232, and the first and second tubes 253, 254 are sized so that the resulting flow paths exist at the sub-millimeter scale. Devices operating at these scales are generally known as microfluidic devices and capillary action generally governs the flow of fluids through these flow paths. This can be advantageous because it more effectively simulates bacterial growth in organic tissues which have similarly sized spaces. For instance, capillaries in the human body are very similar to the flow paths formed within the apparatus when it is scaled such that the flow paths are of the sub-millimeter scale. This allows more accurate recreation of human body conditions and provides more accurate test conditions for certain test processes. Furthermore, it may be advantageous to provide for a very thin frame 210 so that the well may be more readily imaged.

Figure 3:
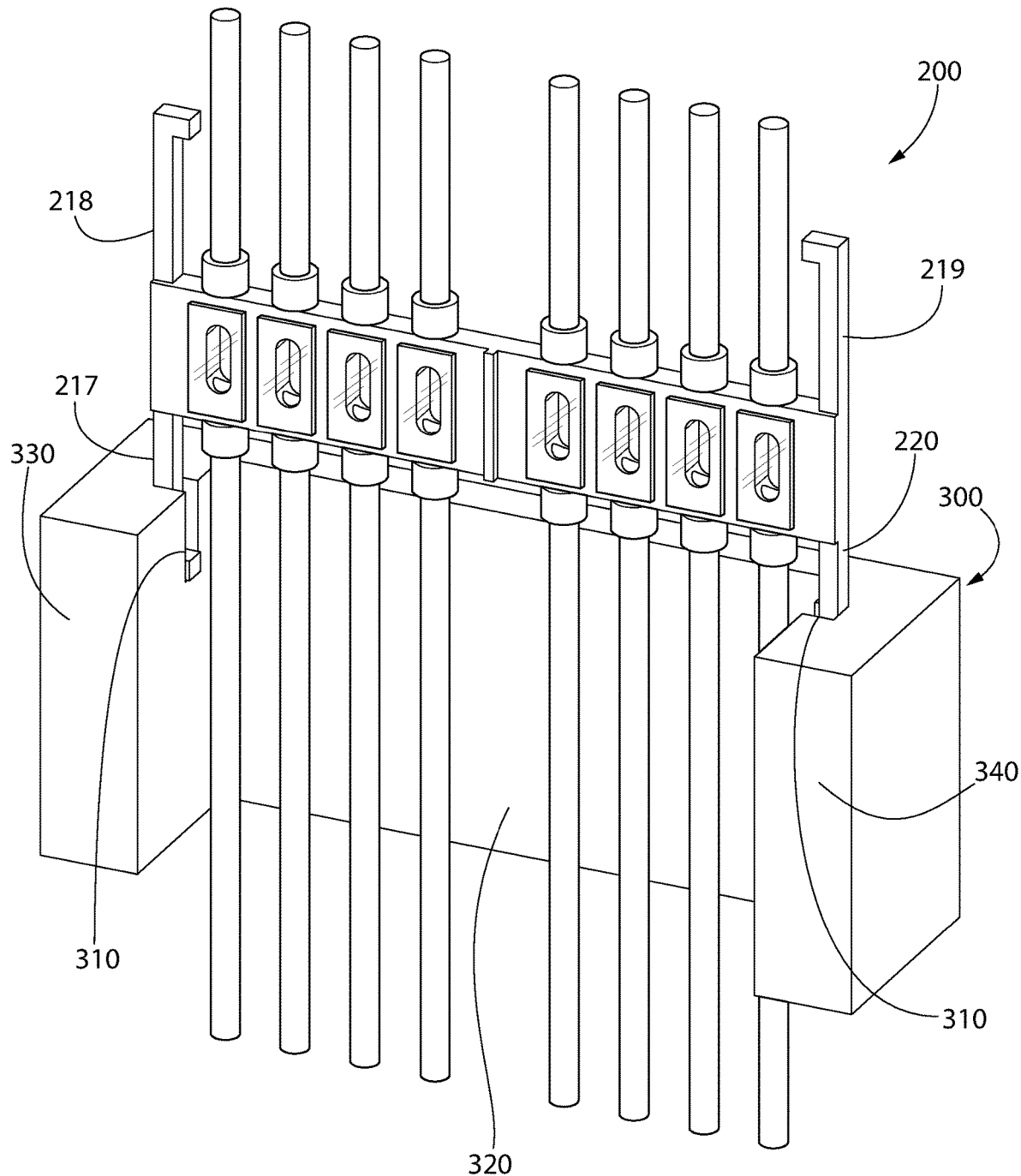
FIG. 3 is a schematic perspective view of an embodiment of the apparatus of FIG. 1 in a stand which maintains the apparatus in a vertical orientation.

FIG. 3 shows the embodiment of the apparatus 200 shown in FIGS. 1 and 2 mounted in a stand 300 which positions the apparatus 200 in a vertical orientation. This can be used to provide realistic growing conditions for live cells in a biological sample without interfering with the ability to image the wells 202 between growing cycles. Two of the arms 217-220 engage depressions 310 formed in the stand 300 so that the stand 300 is securely maintained in the upright orientation. The feet 221 provide additional stability to the apparatus 200 and increase surface area in contact between the apparatus 200 and the stand 300. The apparatus 200 may be arranged with either the third side 213 or the fourth side 214 facing up because the arms 217-220 are symmetrically formed along the longitudinal axis A-A.

Figure 6:
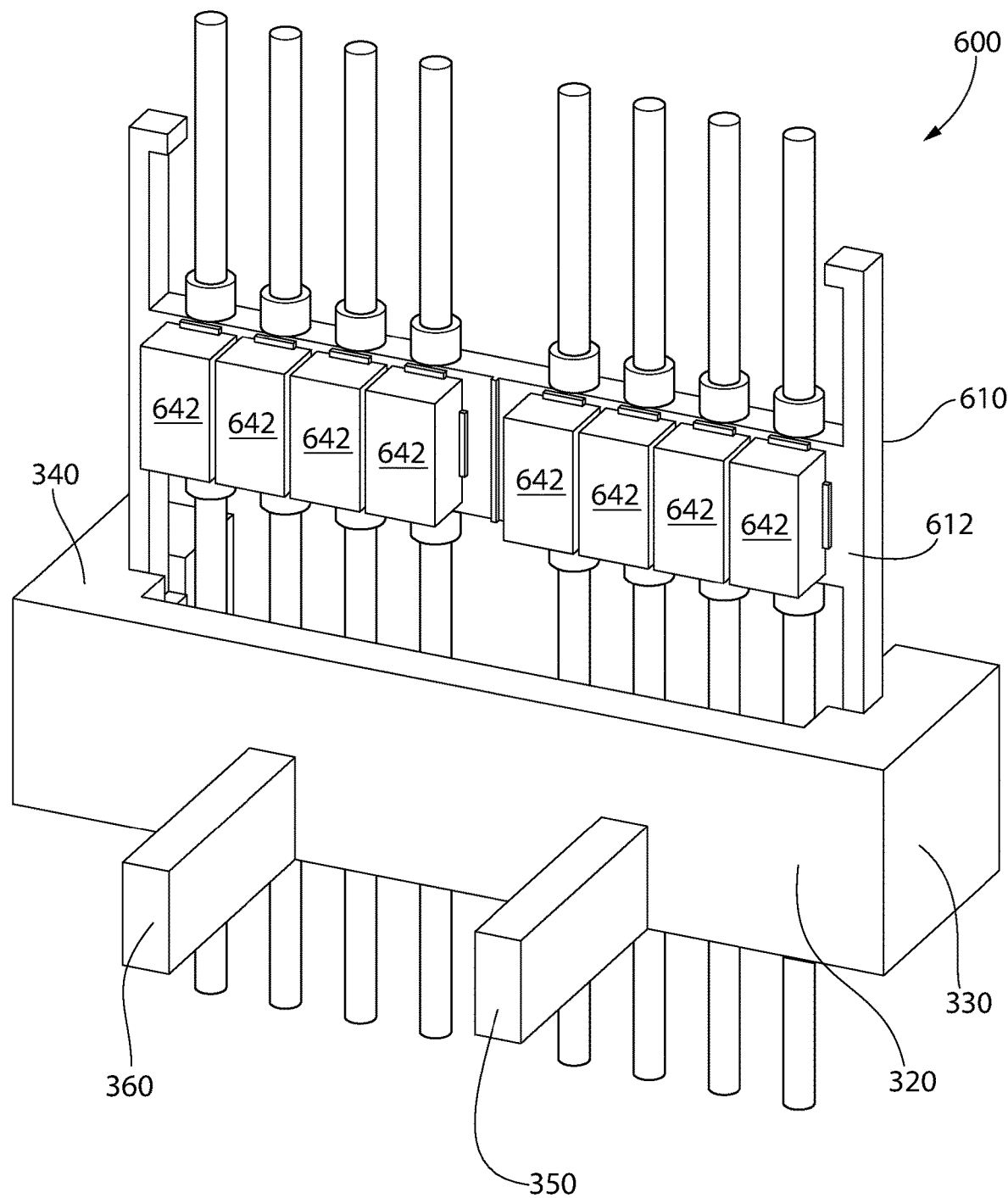
FIG. 6 is a rear schematic perspective view of the apparatus shown in FIG. 5.
Figure 7:
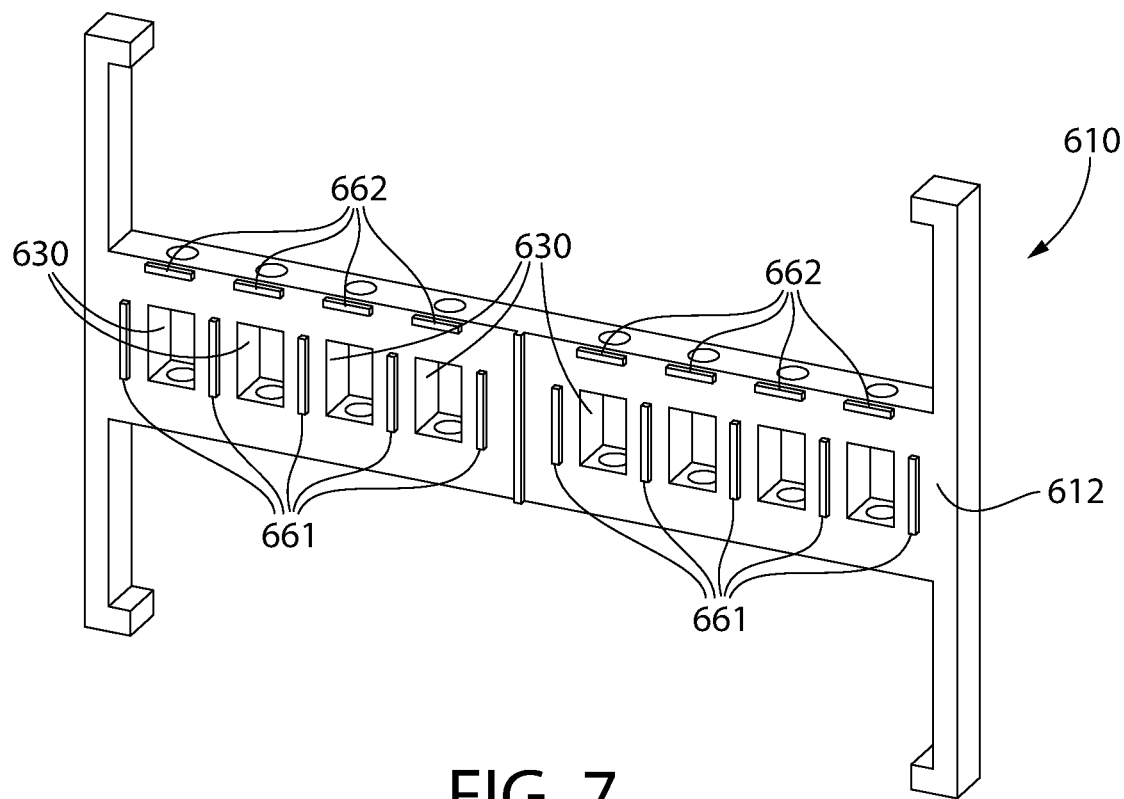
FIG. 7 is a rear schematic view of the frame of the apparatus of FIG. 5.
Figure 8:
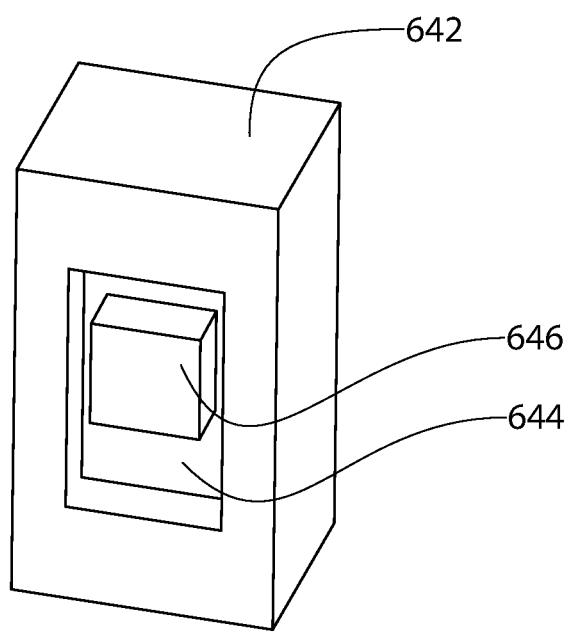
FIG. 8 is a schematic perspective view of the cover of the apparatus shown in FIG. 5.

In one embodiment, the stand 300 has a generally "U" shaped configuration, with a rear wall 320 and left and right forward facing extensions 330, 340. Optionally, the wall 320 and the extensions 330, 340 can all be the same height. In other embodiments, the extensions may have differing heights. As best seen in FIG. 6, the stand 300 also has two rearwardly extending legs 350, 360. These legs 350, 360 are used to further enhance the stability of the stand 300 and may either be a different height from the wall 320 or the same height as the wall 320. In alternate configurations, the legs may extend in any direction and may be arranged in any required manner to maintain the apparatus 200 in the upright configuration.

Figure 4:
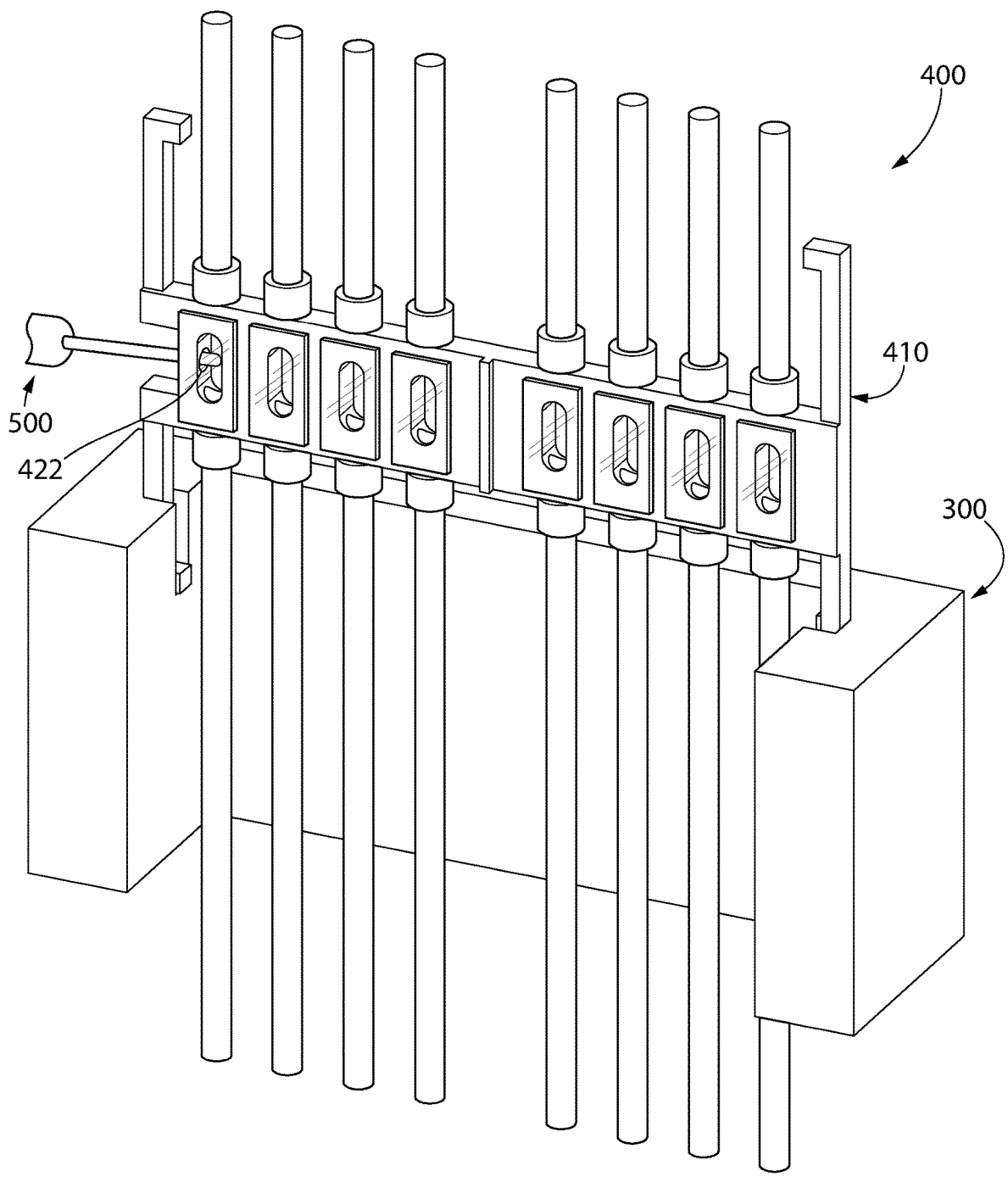
FIG. 4 is a schematic perspective view of another embodiment of the apparatus having a pH probe.
Figure 5:
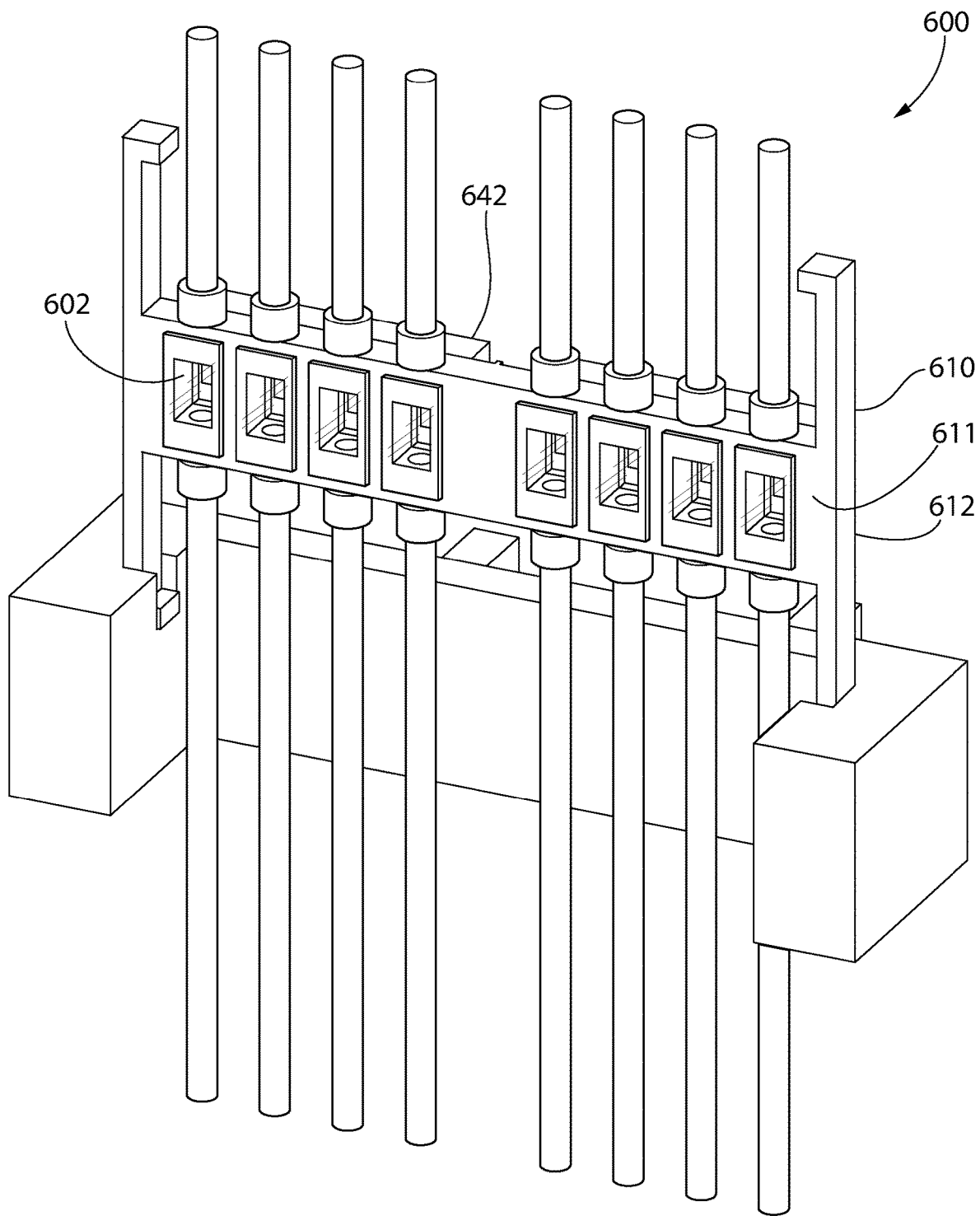
FIG. 5 is a rear schematic perspective view of another embodiment of the apparatus having a cover suitable for mounting a sample.

FIG. 4 shows an embodiment of the apparatus 400 which incorporates a pH probe 500 into a first one of the wells 202 in the frame 410. This allows continuous monitoring of the pH within the well 202 at all times. The pH probe 500 is inserted through a passageway 422 formed in the frame 410, the passageway 422 being sealed around the pH probe 500 after insertion. Optionally, additional pH probes 500 may be incorporated into other wells 202 to permit the monitoring of multiple wells 202 simultaneously. All other features of the apparatus 400 not described may be identified by the same reference numerals as provided with respect to the apparatus 200.

FIGS. 5-8 show another embodiment of the apparatus 600 having an alternate cover arrangement. Instead of the first and second covers being the same, the second cover 642 is formed so that it has a depression 644 therein to accommodate a solid test sample 646. The solid test sample 646 may be a chip of enamel, a slice of tooth material, or any other material the user desires to subject to a test routine. The solid test sample 646 may be placed within the depression 644 and mounted with wax or another adhesive that does not affect either the biological sample under test or the solid test sample 646. The depression 644 should approximately conform to the shape of the aperture 630 and may be any depth required to accommodate the solid test sample 646. The depression 644 is aligned with the aperture 630 so that it is in fluid communication with the aperture and becomes a part of the well 602. If necessary, the aperture 230 may be enlarged to permit the use of any size of solid test sample 646.

As best seen in FIG. 6, the frame 610 has a plurality of protrusions extending from the second side 612 of the frame 610. The plurality of protrusions comprise lateral protrusions 661 extending perpendicular to the longitudinal axis A-A and longitudinal protrusions 662 extending parallel to the longitudinal axis A-A. The lateral protrusions 661 are rectangular and are located on either side of the aperture 230. The longitudinal protrusions 662 are also rectangular and are located on either side of the aperture 230. The protrusions 661, 662 aid with alignment of the second cover 642. The protrusions 661, 662 may also be formed on the first side 611 and aid alignment of the first cover. The protrusions 661, 662 also beneficially enhance the strength of the joint between the frame 610 and the second cover 642, preventing unintended separation of the second cover 642 from the frame 610. Other embodiments of the frame may also incorporate similar protrusions on either the first or second sides to provide similar benefits.

Figure 10:
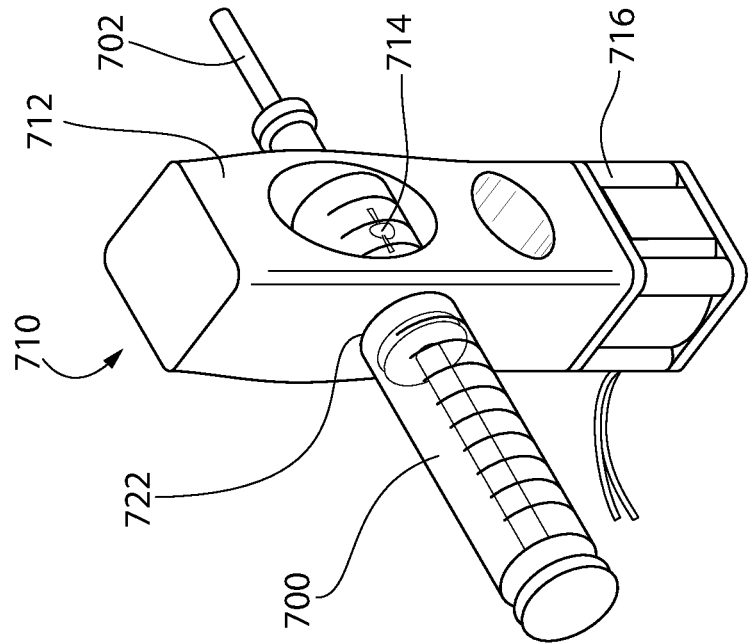
FIG. 10 is a schematic perspective view of the syringe with mixing collar as shown in FIG. 9.
Figure 9:
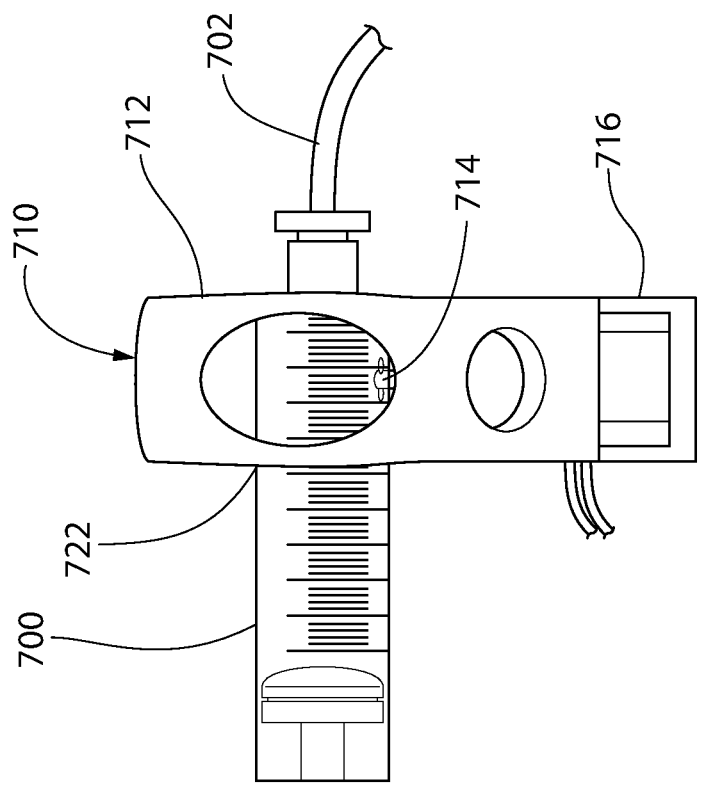
FIG. 9 is a schematic right-side view of a syringe with mixing collar used to keep test fluids in suspension.
Figure 11:
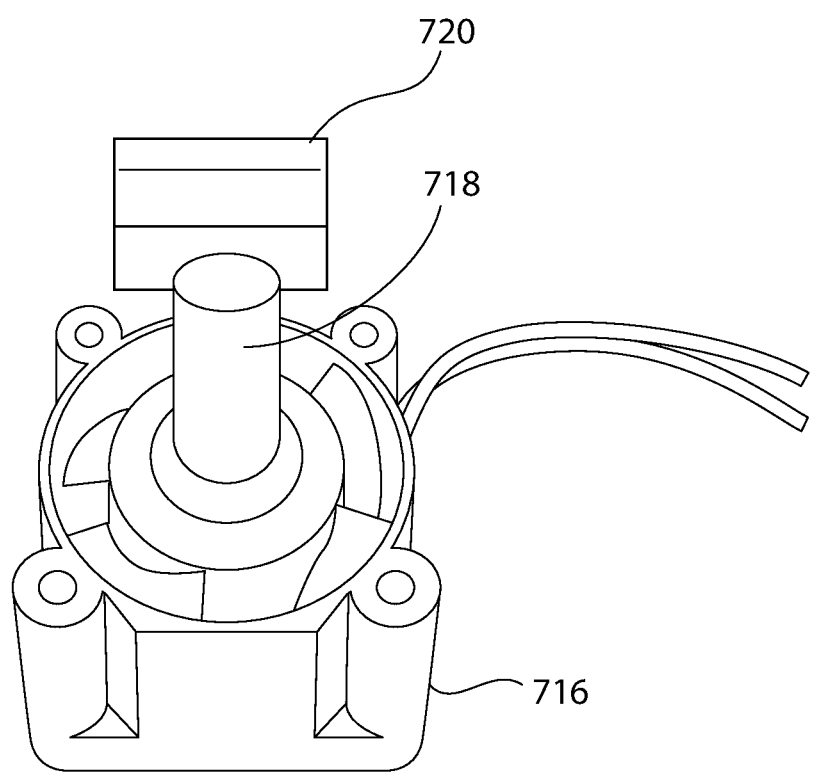
FIG. 11 is a schematic perspective view of the magnet and motor assembly used in the mixing collar of FIG. 9.

FIGS. 9-11 show a syringe 700 in a mixing collar 710 designed to maintain fluids in suspension. The mixing collar 710 is used where a fluid will be injected into the well 202 and that fluid is likely to separate during the test procedure. The syringe 700 is connected to a tube 702 which may be piped directly to a well 202 or may have additional equipment placed between the syringe 700 and the well 202. The syringe 700 may also be operated by a syringe pump or similar device to provide controlled volumes of fluid to the well 202 at any desired interval or flow rate.

The mixing collar 710 comprises a collar 712, a stir bar 714, a motor 716, a magnet coupler 718, and a magnet 720. In the present embodiment, a commercially available fan assembly is used as the motor 716, but any motor having a suitable speed range and torque could be used to rotate the magnet 720 in place of the fan. The stir bar 714 is located within the syringe 700 and the syringe 700 is inserted into a syringe aperture 722 in the collar 712. The motor 716 is operated to spin the magnet 720. This causes the stir bar 714 to spin within the syringe 700, agitating the fluid within the syringe 700. The stir bar 714 may be any commercially available unit and may be either a magnet or a ferromagnetic element encapsulated in a non-reactive covering. The agitation provided by the stir bar 714 and the magnet 720 ensures that any solids or other suspended materials within the fluid in the syringe 700 remain suspended for the duration of the test procedure. The magnet coupler 718 serves to couple the motor 716 to the magnet 720 and position the magnet 720 close enough to the syringe 700 to enable effective functioning of the stir bar 714.

Figure 12:
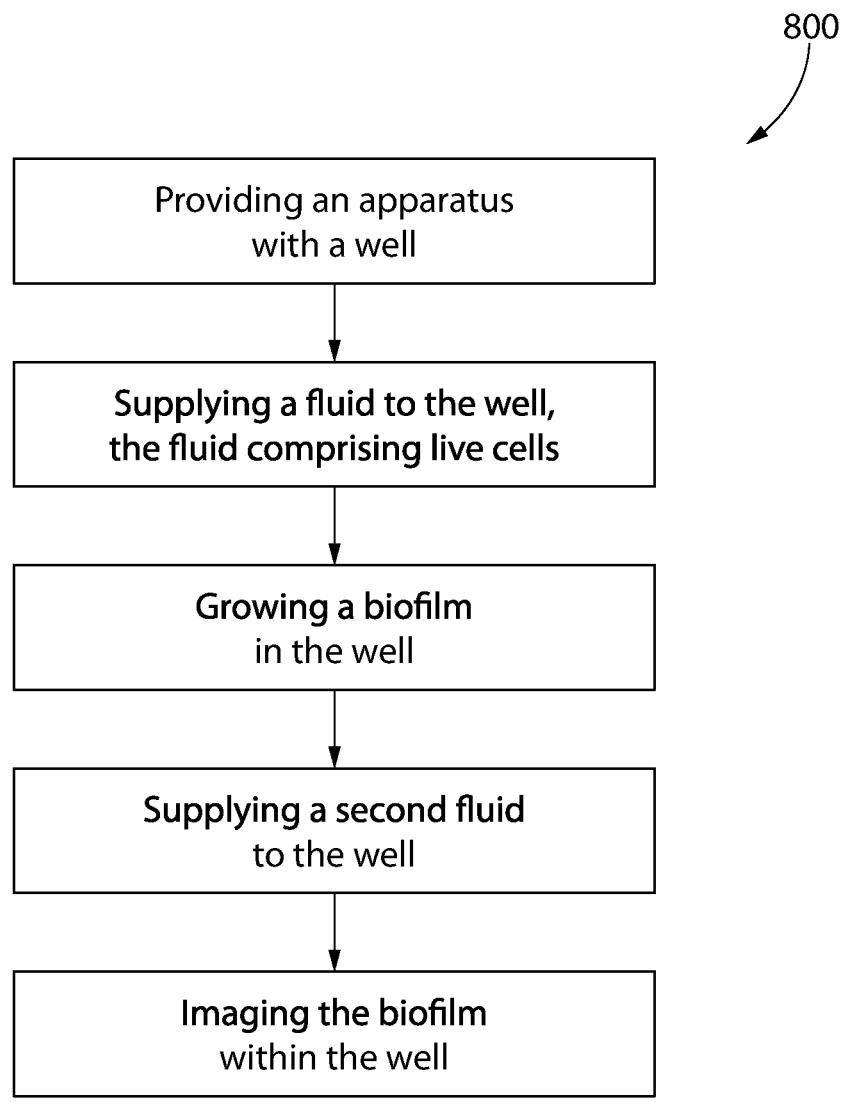
FIG. 12 is a flow chart illustrating a method of using the apparatus shown in FIGS. 1-11.

A method of testing a biological sample is illustrated by the flow chart of FIG. 12. The method 800 comprises providing an apparatus 200 with a well 202. A first fluid comprising live cells is supplied to the well 202. The first fluid is delivered to the well 202 via a first tube 253 or a second tube 254. A biofilm is grown in the well 202 from the live cells in the first fluid. A second fluid is supplied to the well 202 via the first tube 253 or the second tube 254. The biofilm within the well 202 is imaged using an electromagnetic imaging device 100. Resulting cultured and treated biofilms can be analyzed using fluorescence and CLSM imaging to measure biofilm architecture phenotypes, ATP, CFU enumeration, and other metabolic assays for bacterial viability.

In some embodiments, the first fluid comprising the live cells also comprises a growth medium which promotes growth of the live cells. In yet other embodiments, the second fluid provides the growth medium. In some embodiments, the second fluid is supplied to the well 202 substantially simultaneously with the growing of the biofilm. In other embodiments, the biofilm is grown and the second fluid is administered at a later time. In yet other embodiments, the growth of the biofilm and the delivery of the second fluid are repeated after a period of time so as to provide multiple growth opportunities for the biofilm. In yet other embodiments, distilled water is supplied to the well 202 after the growth step, before the step of supplying the second fluid, or after the step of supplying the second fluid. This can advantageously serve as a 'washout' to ensure that only the biofilm remains in the well 202. In yet other embodiments, the well 202 may be heated to promote growth of the biofilm. The well 202 may be heated to a temperature of 37 degrees Celsius, or any temperature between 30 degrees Celsius to 50 degrees Celsius.

In yet another method of testing a biological sample, a first fluid comprising live cells is supplied to the well 202. The first fluid is delivered to the well 202 via a first tube 253 or a second tube 254. A second fluid is supplied to the well 202 via the first tube 253 or the second tube 254 and a biofilm is grown in the well 202. The second fluid may serve as a growth medium for the live cells in the first fluid. Optionally, the second fluid may be sterile so as to prevent contaminating the biofilm. The biofilm within the well 202 may be imaged using an electromagnetic imaging device 100. Subsequent to the imaging of the biofilm, a third fluid may be supplied to the well 202 via the first tube 253 or the second tube 254.

In some embodiments, the second and third fluid may be the same. In yet other embodiments, the second and third fluids may be different. In yet other embodiments, one or both of the second and third fluids may comprise an oral care additive or oral care material. In some embodiments, one or both of the second and third fluids may be distilled water.

In yet another embodiment, a solid test sample 646 is provided within the well 202 during the providing step. This allows the testing of the impacts of the biofilm on the solid test sample 646. For instance, an enamel chip or a dental repair material may be tested in the well 202 to examine how it performs when exposed to a biofilm that is representative of a real-world environment. The solid test sample 646 may be examined for changes in surface roughness, hardness, strength, flexibility, and other parameters. Furthermore, imaging may be taken over the course of the test process to evaluate changes over time and with repeated growth cycles. Thus, an in-situ process may be used to evaluate both the solid test sample 646 and the biofilm for a variety of test procedures.

The method 800 additionally enables the testing of a variety of additives for their impacts on biofilm growth. For instance, a variety of different additives can be incorporated into different fluids to evaluate the impact each additive combination has on the biofilm in an identical testing regime. Imaging may occur at every step of the process to gather longer term information on the efficacy of the various fluids. The surface roughness of the biofilm may be measured in each well 202. In addition, the total volume of the biofilm and the thickness of the biofilm may be measured. Variations on the method 800 permit testing of a vast array of different biological samples while measuring cell growth of the biological samples in-situ.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention and described and claimed herein.

What is claimed is:

1. A system for testing one or more biological samples, the system comprising: a frame comprising: a first side, a second side, a third side, a fourth side, the third side having a first longitudinal passageway and the fourth side having a second longitudinal passageway, the first and second longitudinal passageways configured as fluid conduits, the frame comprising no other fluid conduits other than the first and second longitudinal passageways, the first side, the second side, the third side, and the fourth side forming an outer surface of the frame, and an aperture extending from the first side to the second side, the first and second longitudinal passageways extending through the frame to the aperture; a first cover attached to the first side and covering the aperture; a second cover attached to the second side and covering the aperture;
   at least one well formed by a space enclosed by the first cover, the second, and the aperture; and an electromagnetic imaging device configured to image the one or more biological samples through at least one of: the first cover, or the second cover; wherein the first and second covers form a fluid tight and leak-free joint with the frame such that no fluid escapes from the at least one well except via the first and second longitudinal passageways; and wherein a depth of the well as defined by a distance between the first cover and the second cover is greater than a diameter of the first longitudinal passageway.

2. The system according to claim 1 further comprising a plurality of apertures extending from the first side to the second side.

3. The system according to claim 1 further comprising a second aperture extending from the first side to the second side, a third cover attached to the first side and covering the second aperture, and a fourth cover attached to the second side and covering the second aperture.

4. The system according to claim 1 further comprising a pH probe extending through the frame into the aperture.

5. The system according to claim 1 further comprising a first tube fitting installed in the first longitudinal passageway and a second tube fitting installed in the second longitudinal passageway, a first tube attached to the first tube fitting and a second tube attached to the second tube fitting.

6. The system according to claim 1 wherein the second cover comprises a depression, the depression fluidly coupled with the aperture.

7. The system according to claim 6 further comprising a sample in the depression of the second cover.

8. The system according to claim 1 wherein the first cover and the second cover are attached with an adhesive comprising silicone.

9. The system according to claim 1 further comprising a stand having two depressions, the frame further comprising two arms that engage the two depressions of the stand to maintain the frame in an upright orientation.

10. The system according to claim 1 further comprising a plurality of protrusions extending from the second side of the frame.

11. The system according to claim 10 wherein the second cover is positioned between two of the plurality of protrusions.

12. A method of testing a biological sample, the method comprising:
  a) providing an apparatus, the apparatus comprising:
    a frame comprising:
      a first side,
      a second side,
      a third side,
      a fourth side, the third side having a first longitudinal passageway and the fourth side having a second longitudinal passageway, the first and second longitudinal passageways configured as fluid conduits, the frame comprising no other fluid conduits other than the first and second longitudinal passageways, the first side, the second side, the third side, and the fourth side forming an outer surface of the frame; and
    an aperture extending from the first side to the second side, the first and second longitudinal passageways extending through the frame to the aperture;
    a first cover attached to the first side and covering the aperture;
    a second cover attached to the second side and covering the aperture;
    an electromagnetic imaging device configured to image the biological sample through at least one of: the first cover, or the second cover;
    a well formed by the frame, the first cover, and the second cover;
    a first tube fluidly coupled to the well via the first longitudinal passageway; and
    a second tube fluidly coupled to the well via the second longitudinal passageway, the first and second covers forming a fluid tight and leak-free joint with the frame such that no fluid escapes from the well except via the first tube and the second tube;
  b) supplying a first fluid to the well via the first tube, the first fluid comprising live cells;
  c) growing the biological sample in the form of a biofilm in the well from the live cells in the first fluid;
  d) supplying a second fluid to the well via the first tube, the second fluid being sterile;
  e) imaging the biofilm within the well, via the electromagnetic imaging device through at least one of: the first cover, or the second cover;
  wherein a depth of the well as defined by a distance between the first cover and the second cover is greater than at least one of a diameter of the first tube or a diameter of the second tube.

13. The method according to claim 12 wherein the second fluid comprises a toothpaste.

14. The method according to claim 12 wherein the apparatus comprises a plurality of wells.

15. The method according to claim 12 wherein the second fluid is mixed in a syringe prior to step d).

16. The method according to claim 12 wherein a pH probe is used to monitor the pH within the well.

17. The method according to claim 12 further comprising step a-1) subsequent to step a), step a-1) comprising providing a solid test sample in the well.

18. A system for testing one or more biological samples, the system comprising: a frame having a first side, a second side, a plurality of apertures extending from the first side to the second side, and a third side having a first longitudinal passageway extending through the frame to one of the plurality of apertures, the first side, the second side, the third side, and the fourth side forming an outer surface of the frame; a plurality of first covers, each of the plurality of first covers being configured to be attached to the first side for covering one of the plurality of apertures; and a plurality of second covers, each of the plurality of second covers being configured to be attached to the second side for covering one of the plurality of apertures; wherein when attached to the frame, a distance between the plurality of first covers and the plurality of second covers is greater than a diameter of the first longitudinal passageway; and wherein at least one of the plurality of first covers or the plurality of second covers is configured to allow an electromagnetic imaging device to image one or more biological samples.

* * * * *